Jan. 5, 1926.                                           1,568,452
J. GROSSMAN
VEHICLE JACK
Filed April 22, 1925        3 Sheets-Sheet 1
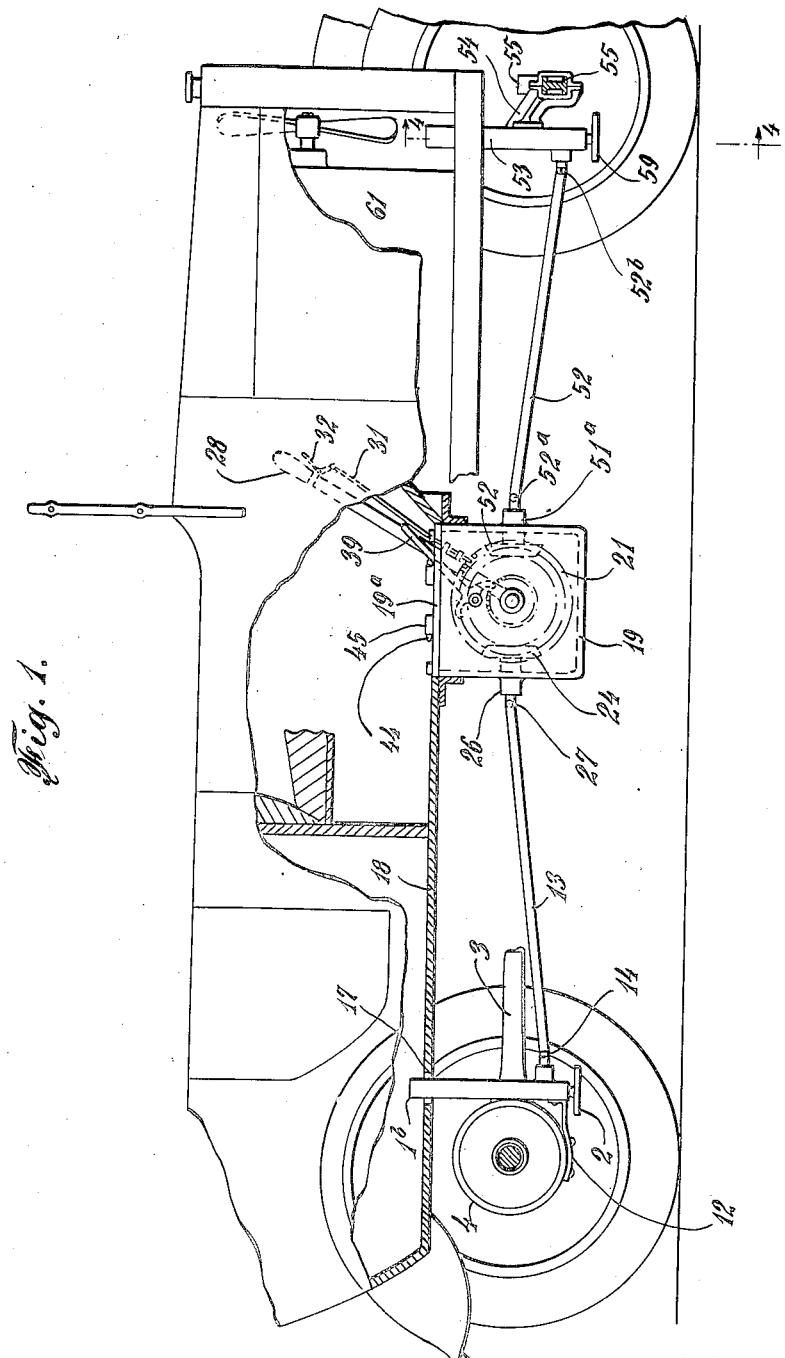
INVENTOR
Jacob Grossman
BY
T. F. Bourne
ATTORNEY

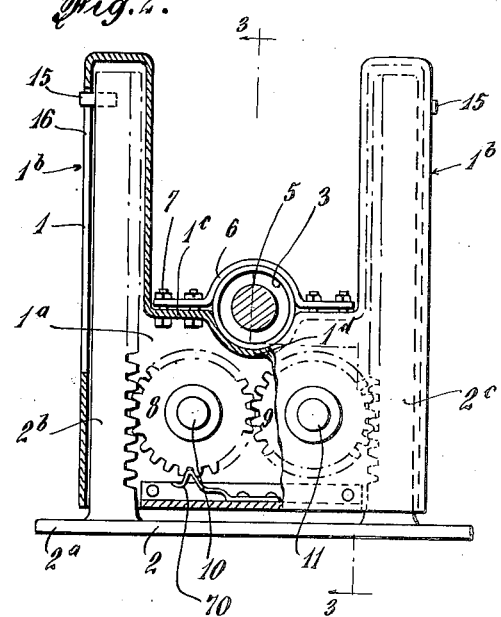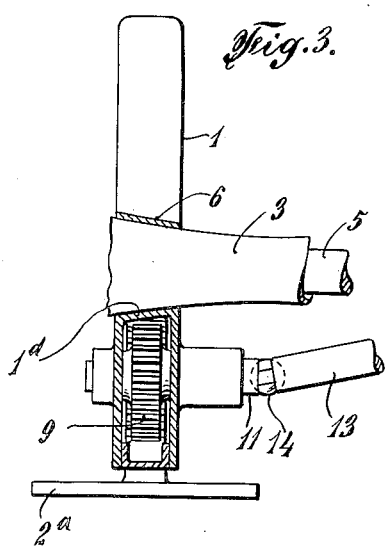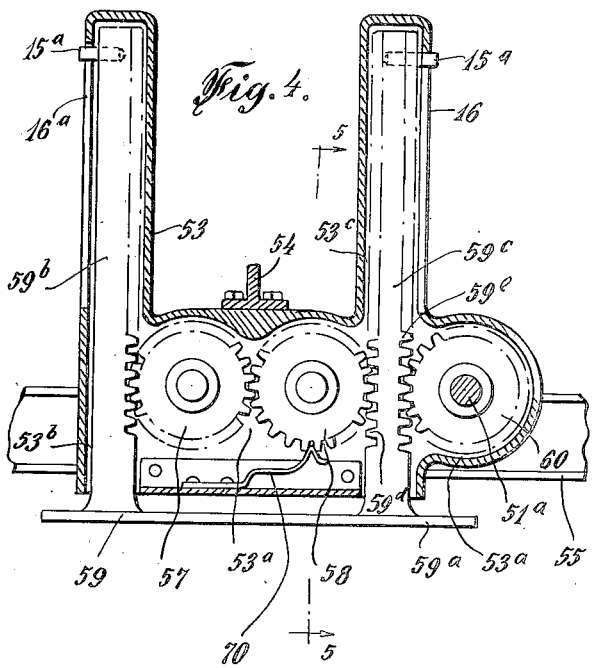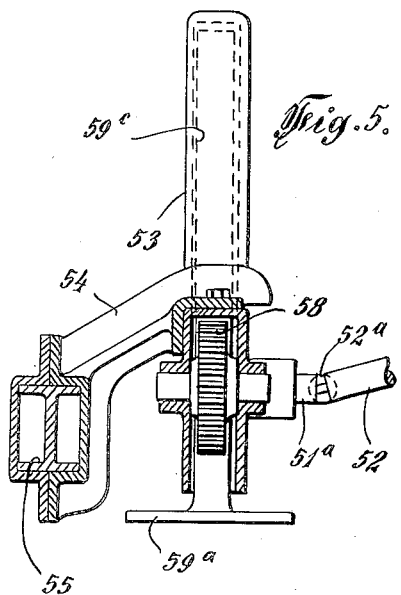

Jan. 5, 1926.
J. GROSSMAN
1,568,452
VEHICLE JACK
Filed April 22, 1925   3 Sheets-Sheet 3
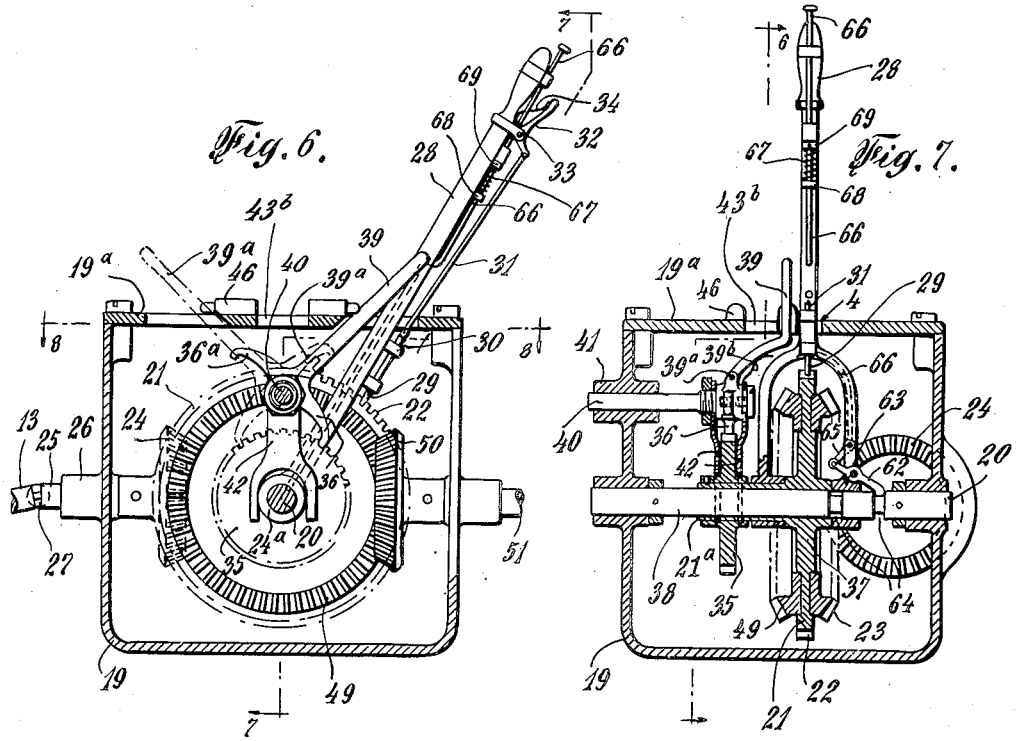
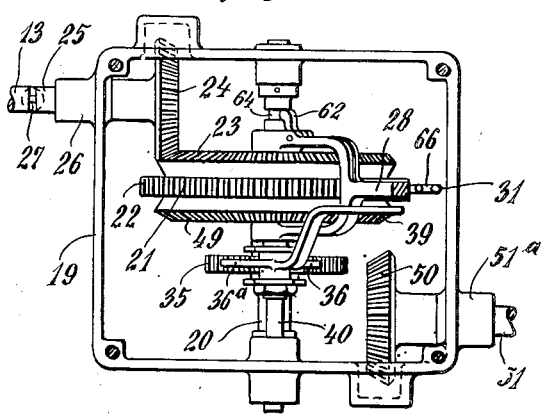
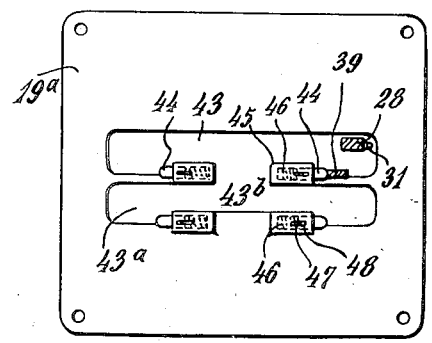
INVENTOR
*Jacob Grossman*
BY
*C. A. Bourne*
ATTORNEY Patented Jan. 5, 1926.

1,568,452

UNITED STATES PATENT OFFICE.

JACOB GROSSMAN, OF MASPETH, NEW YORK.

VEHICLE JACK.

Application filed April 22, 1925. Serial No. 24,947.

*To all whom it may concern:*

Be it known that I, JACOB GROSSMAN, a citizen of the United States, and resident of Maspeth, in the county of Queens and State of New York, have invented certain new and useful Improvements in Vehicle Jacks, of which the following is a specification.

My invention relates to improvements in the class of lifting jacks adapted to be installed permanently in motor vehicles, trucks and the like, whereby the tires at the rear or the front thereof may be raised from the ground or floor when desired. My invention comprises a jack member including a foot and spaced racks extending therefrom, guiding means for the racks, gearing to operate the racks in opposite directions, means to support the guiding means upon the vehicle, and manually controlled means for operating the gearing to raise or lower either jack member. The construction is such that the guiding means for the jack member at the rear of the vehicle may be secured to the protecting tube or housing for the main propeller or drive shaft of the vehicle and the guiding means for the jack member at the front of the vehicle may be secured upon the chassis of the vehicle.

My invention also comprises novel details of improvement that will be more fully hereinafter set forth and then pointed out in the claims.

Reference is to be had to the accompanying drawings forming a part hereof, wherein—

Fig. 1 is a partly sectional side elevation of a vehicle equipped with my improvement;

Fig. 2 is an enlarged sectional detail looking from the left hand side of Fig. 1;

Fig. 3 is a detail section, substantially on line 3, 3, in Fig. 2;

Fig. 4 is an enlarged detail view, partly in section, of the jack member and gearing at the front of the vehicle, looking from the left hand side of Fig. 1;

Fig. 5 is a section on line 5, 5, in Fig. 4;

Fig. 6 is an enlarged sectional view illustrating the manually controlled operating devices for the jack member, substantially on line 6, 6, in Fig. 7;

Fig. 7 is a section on line 7, 7, in Fig. 6;

Fig. 8 is a plan view on line 8, 8, in Fig. 6; and

Fig. 9 is a detail plan view of the retaining means for the manually controlled levers.

Similar numerals of reference indicate corresponding parts in the several views.

At 1 is a housing for enclosing and guiding a jack member 2 at the rear of the vehicle. The housing 1 is in the form of a hollow casing, which may be cast or formed of sheet metal having the parts suitably secured together, which housing is provided with a main chamber or space $1^a$ at the lower part and upwardly extending guideways $1^b$ spaced apart. The upper wall $1^c$ of chamber $1^a$ has a seat $1^d$ to fit against the tube 3 that extends forwardly from the differential housing 4 of a vehicle and encloses drive shaft 5 in a usual way. At 6 is a strap or clamp adapted to fit against tube 3 over seat $1^d$ and to be secured to wall $1^c$ by means of bolts or screws 7, whereby the housing 1 is firmly secured to tube 3, (Fig. 2). The jack member 2 comprises a foot $2^a$ to rest upon the ground or floor and spaced racks $2^b$, $2^c$ extending through chamber $1^a$ and guided in guideways $1^b$, said racks $2^b$, $2^c$ being respectively in mesh with gears 8, 9 located within chamber $1^a$ and in mesh with one another. Said gears are secured to shafts 10, 11 respectively journaled in suitable bearings on housing 1, (Figs. 2 and 3). The housing 1 is preferably provided with a brace 12 extending to the differential housing 4 and firmly secured to said parts, (Fig. 1). The shaft 11 is coupled to an operating shaft 13, preferably by means of a universal joint at 14, for operating the gears 8, 9 to lower or raise the jack member 2. The racks $2^b$, $2^c$ are shown provided with projections or pins 15 that extend through vertical slots 16 in the guideways $1^b$, whereby the pins may stop against the metal at the bottom of such slots to prevent the jack member from being operated so far as to be disengaged from the gears 8, 9 in a downward direction. The arrangement is such that by rotating shaft 13 in one direction the jack member 2 will be raised, as indicated in Fig. 1, in a normal position of nonuse of the jack, said member thereby being in position to be lowered by rotating shaft 13 in the opposite direction for jacking up the rear of the vehicle to raise the tires from the ground or floor for replacing the tires and for other purposes. The housing 1 will enclose the jack mechanism in a secure and guiding way and serve to exclude dirt. The foot member 2ª will be of sufficient length transversely of the vehicle as to properly balance the same when it is jacked up, since the housing is attached centrally of the vehicle to the tube 3 and the racks 2ᵇ, 2ᶜ are located on opposite sides of said tube, whereby lateral thrusts of the jacked up vehicle are resisted. In order to have the racks 2ᵇ, 2ᶜ as high as necessary the guideways 1ᵇ of the housing 1 may extend through corresponding opening 17 in the floor 18 of the vehicle, (Fig. 1).

At a convenient location on the frame of the vehicle, preferably adjacent to the driver's seat, is located a casing 19 suitably secured upon the chassis or body of the vehicle and containing gearing and devices for rotating shaft 13 for actuating the jack member. Transversely disposed in casing 19 is a shaft 20 journaled in suitable bearings on the casing. Slidably mounted upon shaft 20 is a multiple gear 21 having peripheral teeth 22 for manually rotating the gear, and laterally disposed bevel teeth 23 to mesh with a bevel gear 24 adapted to rotate the shaft 13. The gear 24 is carried by a shaft 25 journaled in bearings 26 on casing 19 and preferably a universal joint 27 connects shafts 25 and 13, (Figs. 1 and 6). A lever 28 has a forked lower end straddling the gear 21 and journaled upon shaft 20 and hub 21ª, said lever being provided with dog or pawl 29 to engage the teeth 22 for manually rotating the gear 21 in either direction for correspondingly rotating shaft 13 to cause the jack member 2 to be lowered or raised. The dog 29 is guided in bearings 30 on lever 28 to engage gear teeth 22, (Fig. 6). A rod 31 is pivotally connected with dog 29 and with a bell-crank lever 32 pivoted at 33 on lever 28 in position to be gripped by the operator, a spring at 34 carried by lever 28 bearing against bell-crank lever 32 normally operating the latter and rod 31 to maintain dog 29 in engagement with the teeth 22. The bell-crank 32 may be manipulated for releasing the dog 29 from teeth 22 and re-engaging the same therewith when it is desired to swing lever 28 back and forth for rotating the gearing described.

To retain the multiple gear 21, and thereby through the gearing described to retain the jack member 2 at any desired position, I provide a check gear 35 secured on hub 21ª and check dogs 36 and 36ª to engage said gear. The gears 21 and 35 are connected together by hub 21ª in such a way that when dog 36 is in mesh with gear 35 the gear 21 will be restrained from movement against the weight of the vehicle when the same is jacked up, and when dog 36ª engages gear 35 the weight of the jack member will be resisted. The check dogs are provided with an arm 39 located in position to be controlled by the operator. Arm 39 is jointed at 39ª to swing laterally and normally held centrally by a spring 39ᵇ, (Fig. 7). Said dogs and arm are carried by a rod 40 longitudinally slidable in bearings at 41 on casing 19 and forked arms 42 extend from rod 40 and straddle gear 35, so that when gear 35 is shifted laterally the rod 40 and arm 39 will be correspondingly shifted, (Figs. 6 and 7). By swinging the arm 39 either forward or reverse check dog 36 or check dog 36ª will engage gear 35, according to whether the vehicle is to be jacked up or lowered. In order to resiliently resist arm 39 I provide the top plate 19ª of casing 19 with a slot 43 in which the lever 28 and arm 39 are adapted to be rocked or shifted and I provide spring means to resist arm 39 in either position. For the latter purpose I have shown pin 44 slidable in a keeper 45 and normally pressed outwardly by spring 46 within the keeper, the latter having a slot 47 receiving a pin 48 projecting from pin 44 for limiting the outward movement of the latter by the spring, (Fig. 9). Assuming that gears 23 and 24 are in mesh, the arrangement is such that when lever 28 is in a forward position, (shown in Figs. 1 and 6), the arm 39 will be located against the forward pin 44 and dog 36 will be retained in resilient engagement with gear 35. When the position of the parts is to be reversed the arm 39 will be moved toward lever 28 to release said arm from said pin 44, and then both the lever 28 and arm 39 may be moved rearwardly through slot 43 toward its opposite end. Arm 39 then may be pushed behind the rearmost pin 44 for resiliently retaining the check dog 36ª for engagement with gear 35, whereupon lever 28 may be actuated for operating the jack member in an appropriate direction. The arrangement described is such that by pulling lever 28 toward the operator, (Fig. 1), (with the parts adjusted as in Figs. 6 and 7), the gearing will operate the racks 2ᵇ, 2ᶜ to lower the jack member and jack up the rear wheels, and when the rear of the vehicle is to be lowered the dog 36ª will engage gear 35 and lever 28 will be appropriately operated to rotate gear 21 for raising the jack member.

In order to jack up the front of the vehicle I utilize the same multiple gear 21, lever 28, check gear 35, dogs 36, 36ª and arm 39 with the corresponding parts, and I provide a bevel gear 49 on gear 21, (on the side opposite the gear 23), adapted to engage a gear 50 carried by shaft 51 journaled in bearing 51ª at the front of casing 19 (Fig. 8). A shaft 52 is connected by universal joint 52ª to the shaft 51 (Fig. 5). The gears 24 and 50 are so spaced that when gear 23 is in mesh with gear 24 the gears 49 and 50 will be out of mesh, and by sliding multiple gear 21 along shaft 20 the gears 23 and 24 will be unmeshed and gears 49, 50 will be meshed, the check gear 35 and its check dogs being correspondingly slid. Slot 43 is in communication with a companion slot 43$^a$ having an intermediate slot portion 43$^b$ (Fig. 9), in the nature of a so-called H-slot, whereby the lever 28 and arm 39 may be slid through the slot portion 43$^b$ to locate them in the slot portion 43$^a$ when gears 49, 50 are to be meshed, and vice versa. A forward housing 53, which may be constructed substantially the same as housing 1 in general respects, is supported by brace 54 secured to front axle 55 (Figs. 1 and 4). The housing 53 has a chamber 53$^a$ in which gears 57, 58 are journaled and in mesh, and said housing has guideways 53$^b$, 53$^c$ for a forward jack member 59, which includes a foot or base 59$^a$ and racks 59$^b$, 59$^c$ secured to and rising therefrom, the racks being guided in the guideways 53$^b$, 53$^c$ in manner substantially similar to the parts described respecting the rear housing and jack member of Fig. 2. The rack 59$^b$ is in mesh with gear 57 and rack 59$^c$ has rack teeth on opposite sides, the teeth 59$^d$ being in mesh with gear 58 and the teeth 59$^e$ being in mesh with the gear 60 that is attached to shaft 52 by universal joint 52$^b$, (Figs. 1 and 4), the gear 60 being located in an extension of chamber 53$^a$. Pins 15$^a$ slide in slots 16$^a$ in housing 53 to limit descent of the jack member. The construction is such that the front jack may be located substantially in the middle of the longitudinal line of the vehicle while the shaft 52 is at one side of the plane of the engine 61, so that the housing 53 and jack member 59 are in position to balance the front of the vehicle when it is jacked up and the engine fan will be free to rotate relatively to the housing 53. The arrangement of gearing is such that when gear 50 is rotated by gear 49 in an appropriate direction the gear 60 will be rotated to depress rack member 59$^c$ and its rack teeth 59$^d$ will rotate the idle gear 58 which will rotate the driving gear 57 for the rack 59$^b$, so that both racks and the foot 59$^a$ will be lowered against the ground or floor to jack up the front of the vehicle, and by reversing the rotation of the gear 50 the front jack member will be raised to lower the vehicle.

In order to retain the gears 21, 23 and 49 in either position of lateral adjustment I provide a check pawl 62 which is pivoted at 63 on lever 28 and adapted to alternately engage spaced annular grooves 64 in shaft 20 to retain said gears from lateral movement when gear 23 engages gear 24 or when gear 49 engages gear 50 (Figs. 7 and 8). The pawl 62 is pivotally connected by link 65 to a rod 66 that is guided to slide in suitable bearings in or on lever 28 so that the free end of said rod is in position at the free end of lever 28 to be engaged for operating the pawl 62. A spring 67 coiled around rod 66 bears at one end against a guide 68 on lever 28 and against a stop 69 on rod 66 normally pushing the rod outwardly and thereby through link 65 causing the lower end of pawl 62 to engage one or the other of the grooves 64, according to the lateral position of adjustment of the gear 21 and the lever.

For sustaining the jack members elevated when the gears 24 and 50 are unmeshed from gears 23 and 49 respectively, I provide springs 70 in mesh with the gears 8 and 58, the springs being suitably secured to the housings (Figs. 2 and 4), the springs permitting rotation of said gears from lever 28.

By means of my improvements the operator may shift lever 28 and arm 39 with the associated parts to the left to jack up or let down the rear of the vehicle, or to the right to jack up or let down the front of the vehicle, from his driving position, by appropriately fitting the dog 36 or 36$^a$ in operative relation to check gear 35 and appropriately operating the lever 28 to cause required rotation of the gears 23 or 49 manually.

Changes may be made in the details of construction and arrangement of the parts set forth without departing from the spirit of my invention.

Having now described my invention what I claim is:—

1. The combination of a vehicle having a tube for a propeller shaft, with a lifting jack comprising a housing attached to said tube, a jack member including a foot extending transversely of the vehicle below said tube to engage the ground, spaced parallel racks secured to and extending upwardly from said foot, said racks being located on opposite sides of said tube, said housing guiding said racks, gearing to operate said racks together, and means to rotate the gearing to lower or raise the jack member.

2. The combination of a vehicle having a tube for a propeller shaft, with a lifting jack comprising a housing attached to said tube, a jack member including a foot extending transversely of the vehicle below said tube to engage the ground, spaced parallel racks secured to and extending upwardly from said foot, said racks being located on opposite sides of said tube, said housing guiding said racks, gears within the housing located between said racks and in mesh at their inner portions, said gears being respectively meshed at their outer portions with said racks, and means to rotate said gears to lower or raise the racks and foot.

3. A lifting jack for vehicles comprising a housing, a jack member including a foot and spaced racks extending therefrom, said housing guiding said racks, gears extending transversely between the racks in mesh with each other and respectively in mesh with said racks to operate said racks together, a shaft to rotate one of said gears, said shaft being provided with a gear, a gear to mesh with the last named gear, a lever, means cooperative between said lever and the last named gears for rotating the latter in one or another direction, and means to check rotation of the gearing.

4. A lifting jack as set forth in claim 3, in which the means for checking the rotation of the gearing comprises a gear, check dogs to alternately engage said gear, an arm connected with said dogs to place either dog in engagement with said gear, and means to resilienty retain said arm in different positions.

5. A lifting jack for vehicles comprising a housing, a jack member including a foot and spaced racks extending therefrom, said housing guiding said racks, gearing to operate said racks together, a shaft to rotate one of said gears, said shaft being provided with a gear, a gear to mesh with the last named gear, a lever, a toothed gear connected with the last named gear, said lever having a dog to cooperate with the toothed gear, means to at will operate the dog, a check gear connected with the toothed gear, check dogs to cooperate alternately with the check gear, an arm connected with the check dogs to place either dog in engagement with said gear, and means to resiliently retain the arm in different positions with either of the check dogs in engagement with the check gear.

6. The combination of a wheeled vehicle, jacking means located at the rear and forward portions of the vehicle, shafts to operate said jacking means respectively, each of said shafts having a gear, said gears being spaced apart, gears to mesh with the first named gears respectively and movable laterally to engage and disengage the same, means to at will operate the second named gears to actuate either the rear or the front jacking means, and checking means for the second named gears to retain either of the jacking means in a lowered or elevated position.

7. The combination of a wheeled vehicle, jacking means located at the rear and forward portions of the vehicle, shafts to operate said jacking means respectively, each of said shafts having a gear, said gears being spaced apart, gears to mesh with the first named gears respectively and movable laterally to engage and disengage the same, means to at will operate the second named gears to actuate either the rear or the front jacking means, a check gear connected with the second named gears, check dogs to cooperate with the check gear, and means to remove one of the check dogs from the check gear and engage the other check dog therewith.

8. The combination of a wheeled vehicle, jacking means located at the rear and forward portions of the vehicle, shafts to operate said jacking means respectively, each of said shafts having a gear, said gears being spaced apart, gears to mesh with the first named gears respectively and movable laterally to engage and disengage the same, a toothed gear connected with the second named gears, a lever associated with the toothed gear and provided with a dog to cooperate therewith, means upon the lever to control said dog, and checking means for the gears to resist their rotation in one or another direction.

9. The combination of a wheeled vehicle, jacking means located at the rear and forward portions of the vehicle, shafts to operate said jacking means respectively, each of said shafts having a gear, said gears being spaced apart, gears to mesh with the first named gears respectively and movable laterally to engage and disengage the same, a toothed gear connected with the second named gears, a lever associated with the toothed gear and provided with a dog to cooperate therewith, a check gear connected with the second named gears and toothed gear, check dogs to cooperate with the check gear, an arm to operate the check dogs, and means to resiliently retain said arm in set position.

10. The combination of a wheeled vehicle, jacking means located at the rear and forward portions of the vehicle, shafts to operate said jacking means respectively, each of said shafts having a gear, said gears being spaced apart, gears to mesh with the first named gears respectively and movable laterally respecting the same, a toothed gear connected with the second named gears, a lever associated with the toothed gear and provided with a dog to cooperate therewith, a check gear connected with the second named gears and toothed gear, check dogs to cooperate with the check gear, an arm to operate the check dogs, means to resiliently retain said arm in set position, said check gear and dogs being laterally movable, and means to resiliently resist said arm in either position of adjustment of the check gear and check dog.

11. A lifting jack as set forth in claim 10, provided with a plate having a slot comprising two longitudinally disposed portions and an intermediate portion communicating therewith adapted to receive said lever and arm, said plate being provided with resilient means to resist the arm in either position of adjustment thereof.

12. The combination of a wheeled vehicle, jacking means located at the rear and forward portions of the vehicle, shafts to operate said jacking means respectively, each of said shafts having a gear, said gears being spaced apart, gears to mesh with the first named gears respectively and movable laterally respecting the same, a toothed gear connected with the second named gears, a shaft slidably supporting the second named gears and the toothed gear, a lever provided with means to engage the toothed gear for rotating said gears at will, checking means for the gears, said shaft having spaced grooves, a check pawl carried by the lever to engage said grooves, and means to actuate the check pawl.

13. A lifting jack for vehicles as set forth in claim 12, in which the means to actuate the check pawl comprises a rod slidably guided by the lever, and a spring to normally retain the check pawl in engagement with one of said grooves.

JACOB GROSSMAN.